United States Patent

[11] 3,597,740

[72] Inventors Royal H. Daw
Sherman Oaks;
Alexander Hurwitz, Los Angeles, both of, Calif.
[21] Appl. No. 697,848
[22] Filed Jan. 15, 1968
[45] Patented Aug. 3, 1971
[73] Assignee International Business Machines Corporation
Armonk, N.Y.

[54] INTERPOLATION AND INITIALIZATION TECHNIQUE FOR COMPUTER CONTROL OF MACHINE TOOLS
8 Claims, 6 Drawing Figs.

[52] U.S. Cl. 340/172.5, 235/151.11
[51] Int. Cl. G06c 29/00
[50] Field of Search 340/172.5; 235/151.11

[56] References Cited

UNITED STATES PATENTS

| | | | |
|---|---|---|---|
| 2,875,390 | 2/1959 | Tripp | 318/39 |
| 3,109,974 | 11/1963 | Hallmark | 318/163 |
| 3,272,975 | 9/1966 | Csech | 235/151.11 |
| 3,286,085 | 11/1966 | Rado | 235/151.11 |
| 3,375,354 | 3/1968 | McGarrell | 235/151.11 |
| 3,390,315 | 6/1968 | McDonough et al. | 318/162 |
| 3,430,036 | 2/1969 | Patrick | 235/151.11 |

*Primary Examiner*—Paul J. Henon
*Assistant Examiner*—Mark Edward Nusbaum
*Attorneys*—Hanifin and Jancin and John L. Jackson ABSTRACT: An interpolation technique in which numbers are calculated for each axis based on the velocity and distance to be moved and the numbers stored in output buffer tables in core storage for gating out by an oscillator external to the processing system. Each core storage output buffer table is initialized by a look-ahead technique in which the calculated numbers for each axis are examined and a determination made as to whether for a particular segment more ones than zeros are to be stored and the core storage portion for that segment initialized in accordance with this determination.

| REGISTERS | | | | | |
|---|---|---|---|---|---|
| x – AXIS | | y – AXIS | | z – AXIS | |
| J | R | J | R | J | R |
| 7 | .5 | 7 | .5 | 15 | .0 |
| 15 | .0 | 15 | .0 | 30 | .0 |
| 22 | .5 | 22 | .5 | | |
| 30 | .0 | 30 | .0 | | |

*INVENTORS.*
ROYAL H. DAW
ALEXANDER HURWITZ

BY John L. Jackson
ATTORNEY

| STEP | COMMAND WORDS | | | | | |
|---|---|---|---|---|---|---|
| | X | | Y | | Z | |
| 001 | 0 | 0 | 0 | 0 | 0 | 0 |
| 002 | 0 | 0 | 0 | 0 | 0 | 0 |
| 003 | 0 | 0 | 0 | 0 | 0 | 0 |
| 004 | 0 | 0 | 0 | 0 | 0 | 0 |
| 005 | 0 | 0 | 0 | 0 | 0 | 0 |
| 006 | 0 | 0 | 0 | 0 | 0 | 0 |
| 007 | 1 | 0 | 0 | 1 | 0 | 0 |
| 008 | 0 | 0 | 0 | 0 | 0 | 0 |
| 009 | 0 | 0 | 0 | 0 | 0 | 0 |
| 010 | 0 | 0 | 0 | 0 | 0 | 0 |
| 011 | 0 | 0 | 0 | 0 | 0 | 0 |
| 012 | 0 | 0 | 0 | 0 | 0 | 0 |
| 013 | 0 | 0 | 0 | 0 | 0 | 0 |
| 014 | 0 | 0 | 0 | 0 | 0 | 0 |
| 015 | 1 | 0 | 0 | 1 | 1 | 0 |
| 016 | 0 | 0 | 0 | 0 | 0 | 0 |
| 017 | 0 | 0 | 0 | 0 | 0 | 0 |
| 018 | 0 | 0 | 0 | 0 | 0 | 0 |
| 019 | 0 | 0 | 0 | 0 | 0 | 0 |
| 020 | 0 | 0 | 0 | 0 | 0 | 0 |
| 021 | 0 | 0 | 0 | 0 | 0 | 0 |
| 022 | 1 | 0 | 0 | 1 | 0 | 0 |
| 023 | 0 | 0 | 0 | 0 | 0 | 0 |
| 024 | 0 | 0 | 0 | 0 | 0 | 0 |
| 025 | 0 | 0 | 0 | 0 | 0 | 0 |
| 026 | 0 | 0 | 0 | 0 | 0 | 0 |
| 027 | 0 | 0 | 0 | 0 | 0 | 0 |
| 028 | 0 | 0 | 0 | 0 | 0 | 0 |
| 029 | 0 | 0 | 0 | 0 | 0 | 0 |
| 030 | 1 | 0 | 0 | 1 | 1 | 0 |

FIG. 3

| REGISTERS | | | | | |
|---|---|---|---|---|---|
| x – AXIS | | y – AXIS | | z – AXIS | |
| J | R | J | R | J | R |
| 5 | .0 | 3 | .5 | 7 | .0 |
| 10 | .0 | 7 | .0 | 14 | .0 |
| 15 | .0 | 10 | .5 | 21 | .0 |
| 20 | .0 | 14 | .0 | 28 | .0 |
| 25 | .0 | 17 | .5 | 35 | .0 |
| 30 | .0 | 21 | .0 | | |
| 35 | .0 | 24 | .5 | | |
| | | 28 | .0 | | |
| | | 31 | .5 | | |
| | | 35 | .0 | | |

FIG. 4

| STEP | INITIALIZED COMMAND WORDS | | | | | | FINAL COMMAND WORDS | | | | | |
|---|---|---|---|---|---|---|---|---|---|---|---|---|
| | X | | Y | | Z | | X | | Y | | Z | |
| 001 | 0 | 0 | 0 | 1 | 0 | 0 | 0 | 0 | 0 | 1 | 0 | 0 |
| 002 | 0 | 0 | 0 | 1 | 0 | 0 | 0 | 0 | 0 | 1 | 0 | 0 |
| 003 | 0 | 0 | 0 | 1 | 0 | 0 | 0 | 0 | 0 | 0 | 0 | 0 |
| 004 | 0 | 0 | 0 | 1 | 0 | 0 | 0 | 0 | 0 | 1 | 0 | 0 |
| 005 | 0 | 0 | 0 | 1 | 0 | 0 | 1 | 0 | 0 | 1 | 0 | 0 |
| 006 | 0 | 0 | 0 | 1 | 0 | 0 | 0 | 0 | 0 | 1 | 0 | 0 |
| 007 | 0 | 0 | 0 | 1 | 0 | 0 | 0 | 0 | 0 | 0 | 1 | 0 |
| 008 | 0 | 0 | 0 | 1 | 0 | 0 | 0 | 0 | 0 | 1 | 0 | 0 |
| 009 | 0 | 0 | 0 | 1 | 0 | 0 | 0 | 0 | 0 | 1 | 0 | 0 |
| 010 | 0 | 0 | 0 | 1 | 0 | 0 | 1 | 0 | 0 | 1 | 0 | 0 |
| 011 | 0 | 0 | 0 | 1 | 0 | 0 | 0 | 0 | 0 | 1 | 0 | 0 |
| 012 | 0 | 0 | 0 | 1 | 0 | 0 | 0 | 0 | 0 | 1 | 0 | 0 |
| 013 | 0 | 0 | 0 | 1 | 0 | 0 | 0 | 0 | 0 | 1 | 0 | 0 |
| 014 | 0 | 0 | 0 | 1 | 0 | 0 | 0 | 0 | 0 | 0 | 1 | 0 |
| 015 | 0 | 0 | 0 | 1 | 0 | 0 | 1 | 0 | 0 | 1 | 0 | 0 |
| 016 | 0 | 0 | 0 | 1 | 0 | 0 | 0 | 0 | 0 | 1 | 0 | 0 |
| 017 | 0 | 0 | 0 | 1 | 0 | 0 | 0 | 0 | 0 | 0 | 0 | 0 |
| 018 | 0 | 0 | 0 | 1 | 0 | 0 | 0 | 0 | 0 | 1 | 0 | 0 |
| 019 | 0 | 0 | 0 | 1 | 0 | 0 | 0 | 0 | 0 | 1 | 0 | 0 |
| 020 | 0 | 0 | 0 | 1 | 0 | 0 | 1 | 0 | 0 | 1 | 0 | 0 |
| 021 | 0 | 0 | 0 | 1 | 0 | 0 | 0 | 0 | 0 | 0 | 1 | 0 |
| 022 | 0 | 0 | 0 | 1 | 0 | 0 | 0 | 0 | 0 | 1 | 0 | 0 |
| 023 | 0 | 0 | 0 | 1 | 0 | 0 | 0 | 0 | 0 | 1 | 0 | 0 |
| 024 | 0 | 0 | 0 | 1 | 0 | 0 | 0 | 0 | 0 | 0 | 0 | 0 |
| 025 | 0 | 0 | 0 | 1 | 0 | 0 | 1 | 0 | 0 | 1 | 0 | 0 |
| 026 | 0 | 0 | 0 | 1 | 0 | 0 | 0 | 0 | 0 | 1 | 0 | 0 |
| 027 | 0 | 0 | 0 | 1 | 0 | 0 | 0 | 0 | 0 | 1 | 0 | 0 |
| 028 | 0 | 0 | 0 | 1 | 0 | 0 | 0 | 0 | 0 | 0 | 1 | 0 |
| 029 | 0 | 0 | 0 | 1 | 0 | 0 | 0 | 0 | 0 | 1 | 0 | 0 |
| 030 | 0 | 0 | 0 | 1 | 0 | 0 | 1 | 0 | 0 | 1 | 0 | 0 |
| 031 | 0 | 0 | 0 | 1 | 0 | 0 | 0 | 0 | 0 | 0 | 0 | 0 |
| 032 | 0 | 0 | 0 | 1 | 0 | 0 | 0 | 0 | 0 | 1 | 0 | 0 |
| 033 | 0 | 0 | 0 | 1 | 0 | 0 | 0 | 0 | 0 | 1 | 0 | 0 |
| 034 | 0 | 0 | 0 | 1 | 0 | 0 | 0 | 0 | 0 | 1 | 0 | 0 |
| 035 | 0 | 0 | 0 | 1 | 0 | 0 | 1 | 0 | 0 | 0 | 1 | 0 |

FIG. 5

INTERPOLATION AND INITIALIZATION TECHNIQUE FOR COMPUTER CONTROL OF MACHINE TOOLS

BACKGROUND OF INVENTION

1. Field of Invention

This invention relates to the computer control of machine tools and other precise mechanisms in general and, more particularly, to an interpolation technique for use in a system in which an external oscillator is used to gate command words from output buffer tables in a core storage unit to the servos of an associated machine tool.

Discussion of the Prior Art

In a patent application entitled "Demand Computer System for Machine Tool Control" by Jack Rosenberg, Roy A. Daw, and David M. Bottles, assigned to the assignee of the present application, Ser. No. 697,849, filed Jan. 15, 1968 there is described a system for controlling a machine tool in which a demand oscillator is used to gate previously calculated command words from a core storage unit to the servos of a machine tool. In this system the frequency of the demand oscillator is set such that if all of the bits in the command words contain ones or action bits, the machine tool will move at its maximum feedrate. That is, if a machine tool with a 0.001 inch resolution has a maximum vector feedrate of 60 inches per minute, it must receive a pulse every millisecond to drive at its maximum rate. Hence, in this case, the sampling interval cannot be longer than a millisecond, and if the machine tool is driven at less than 60 inches per minute, some of the command words will be null words.

In this system, to relieve processor loading, all possible valid command words for each segment are stored in a secondary store and are then moved into core storage output buffer tables as the interpolation process proceeds. While this type of secondary storage of command words is feasible in a system in which a small number of axes are to be controlled and where, as in the above referenced system, the particular interpolation technique makes such an approach feasible, where a different interpolation technique is used which is not amenable to this type of control or where a machine tool having, for instance, 5 axes to be controlled, such an approach is not feasible. In the interpolation technique of the above referenced application, the minor axis commands are constrained such that they cannot contain command bits unless the major axis contains a command bit. This greatly reduces the possible command words which have to be stored.

Another shortcoming of the interpolation technique provided in the above referenced application is that due to the above mentioned constraint in which the bit positions associated with the minor axis cannot command movement unless the major axis also commands movement, the relative spacing of the pulses applied to each of the axes to be driven are not uniformly spaced in time. This last property is desirable in the control of a machine tool since a perfectly periodic pulse train results in uniform servo action and thus, a smoother cut of the workpiece, and maximum freedom from servomechanical resonant effects.

SUMMARY

Briefly, there is provided an interpolation technique for use primarily with a system in which an external oscillator is used to gate command words stored in a core storage unit to the servos of an associated machine tool. In this technique numbers are calculated based on the distance and velocity which each slide is to move during the cutting of a segment and these numbers are added and command or one bits entered into the appropriate bit positions of the command words in output buffer tables in the core storage unit.

The loading of the control computer central processing unit is reduced by a technique of examining the numbers generated to determine if more ones than zeros, or vice versa, are to be stored in the output buffer table for a particular segment and for each axis and the output buffer table for that section initialized in accordance with this determination. In the event that more ones than zeros are to be stored in the bit positions of the command words associated with a particular axis, the number associated with that axis is then recalculated such that the modification of the command words in the output buffer tables of the core storage unit will result in the bit positions which had been initialized to ones being selectively changed to zeros.

BRIEF DESCRIPTION OF THE DRAWINGS

FIG. 3 is a table illustrative of the command words stored in core as a result of the interpolation routine illustrated in FIG. 2 when the subject look-ahead technique is not used;

FIG. 4 is a table illustrative of the contents of the register associated with each axis during another interpolation routine;

FIG. 5 is a table illustrative of the contents of the core storage unit when the subject look-ahead technique is used with the values of the tables of FIG. 4;

DESCRIPTION OF THE PREFERRED EMBODIMENT

To drive the machine tool in real time the computer must provide a command to the servo of each slide indicating either one increment of movement in the positive direction, one increment of movement in the negative direction or no movement at all. The computer provides this information in the form of a command word in which two bits positions are reserved for each axis of the machine tool. A one, or command bit, in the leftmost of these two positions will command a movement of one increment in the negative direction, while a one in the rightmost position will command a movement of the associated slide one increment in the positive direction. A zero in both positions indicates that no movement is commanded, while command bits in both positions are illegal.

The procedure for a part programmer using the subject system is very similar to that for a conventional numerically controlled machine tool. The part programmer described the part to be cut and how it is to be cut by writing a computer program in the APT (Automatic Programmed Tool) language. This program is processed by an APT processor on a large computer to produce a cutter location tape (CL tape).

The CL tape gives the absolute coordinates of the location of the centerline of the cutting tool, as well as feedrate and some other miscellaneous data. The CL tape contains information that is appropriate and necessary for cutting the described part with any numerically controlled machine tool. In a conventional numerically controlled system another computer program, called a postprocessor, would use the CL tape as input and produce a punched tape designed for a particular machine tool as output. This punched tape, which has the format required for a particular director and a particular machine tool, would then drive this director so that it would control the machine tool to cut the part. In the subject system a special APT postprocessor produces a magnetic tape or a deck of punched cards as input to the controlling computer.

Unlike the conventional system above described which uses an APT program with its associated programming language and numerical control processor, the subject system is not restricted to a particular programming language or processor for producing the CL tape. The controlling computer (DNC Computer) need not be as powerful a machine in terms of speed and memory capacity as normally needed for an APT processor which produces data for three-dimensional cutting.

Figures 1, 2:
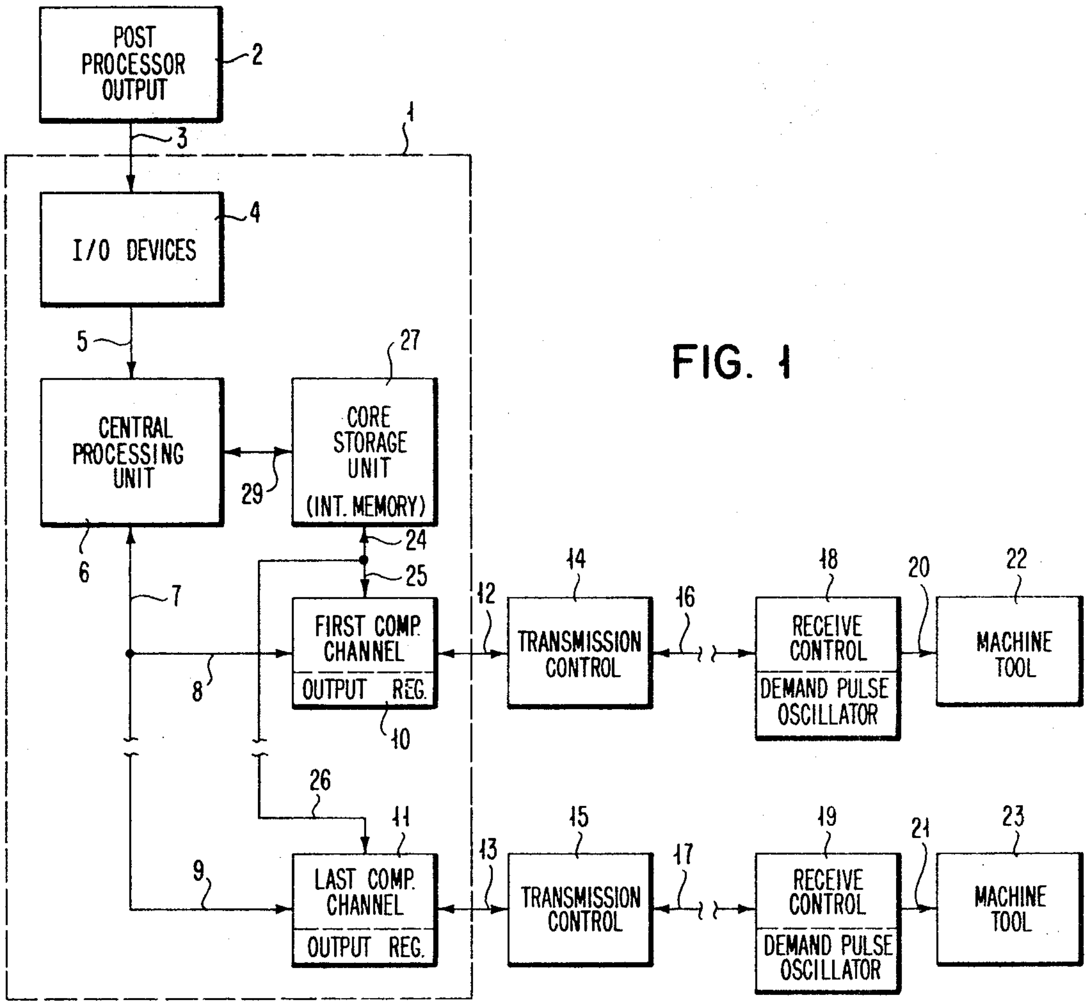
FIG. 1 is an overall block diagram illustrative of the system in which the subject novel interpolation and initialization technique can be utilized.
FIG. 2 is a table illustrative of the contents of the registers associated with each axis during an interpolation routine.

In FIG. 1 is shown in block form the direct numerical control computer (DNC Computer) 1, such as the IBM 1800 Computer System with peripheral devices as described in the following manuals: "1800 Function Characteristics Manual," IBM, Form No. A26—5918; "1800 Assembly Language Manual," IBM, Form No.C26—5882, 1956; "1800 Fortran Language Manual" IBM, Form No. C26—3715, 1956; "1800 TSX Manual (Time Sharing Executive)," IBM, 1956. The computer 1 may be a general purpose, digital computer with an internally stored program to control the performance of its components or a hardwired configuration which includes a central processing unit 6, such as the IBM 1802 described in "1800 Function Characteristics Manual" referenced above; which performs the arithmetic and control functions of the computer; the I/O devices 4 such as card readers, magnetic tape units, printers and typewriter terminals, such as those described in "1800 Function Characteristics Manual" as referenced above; the core storage unit 27, such as that used in the IBM 1800 as described in the "1800 Function Characteristics Manual" referenced above, which is the internal memory unit; and finally, the computer channels 10 and 11, such as the computer channel used in the IBM 1800 which is specifically described in "Manual for RPQ CO1—451, 2, 3, 4, 5" and "Channel Multiplexer for 1800," IBM, Form No. L26—2103, 1956. Each of the channels 10 and 11 can read from and write into the core storage unit asynchronously with the operation of the central processing unit on a cycle steal basis. It should be understood that a channel comprises that portion of a modern high-speed computer which operates to make the working of the computer independent of the slower speeds of the input/output (I/O) equipment, whose operation and functions are more fully explained in "Computer Programming Fundamentals," by Herbert D. Leeds and Gerald M. Weinberg, McGraw Hill, 1961, pages 141—143 and 150—158. The DNC computer is operated in a time-sharing mode so that multiple machine tools can be 1967, simultaneously.

As shown in FIG. 1, the postprocessor output 2 is applied along line 3 to the I/O devices 4 of the computer 1. The postprocessor output to computer comprises conventional computer output data, on any of various media and formats, from a general purpose computer system processing an automatic machine tool program, to be used for control of numerical control applications. An example of such a program is the IBM "APT" program and the "APT Part Programming" as outlined by IIT Research Institute, McGraw Hill, 1967, page 21—28. As above indicated, the postprocessor output may be in the form of cards or magnetic tape as that provided by the General Electric GECENT, The output is converted in the I/O devices 4 into electrical signals of suitable level for use by the central processing unit 6 and these electrical signals are applied along line 5 to the CPU 6. Associated with the CPU 6 along line 29 is a core storage unit 27. This is a conventional unit connected in a conventional manner to the CPU. The core storage unit 27 is connected along lines 24 and 25 to a channel 10 and along lines 24 and 26 to a channel 11. The channels 10 and 11 are operative to bring the contents of selected areas of the core storage unit 27 into their output registers. A channel 10 is connected along lines 7 and 8 to the CPU 6 and channel 11 is connected along lines 7 and 9 to the CPU 6. As illustrated in FIG. 1, there may be one or a number of channels. As will hereinafter become apparent, a channel is required for each machine tool to be controlled. The operation of the CPU 6 and channels 10 and 11 to bring the contents of selected areas of the core storage unit 27 into the output registers of the channels is conventional. A more complete description of this operation can be found for instance in the IBM publications A26—5921, A26—5920 and A26—5918.

Channel 10 is connected along line 12 to a transmission control unit 14 which in turn is connected along line 16 to receive control unit 18. The receive control unit 18 is connected along line 20 to the machine tool 22. Examples of the type machine tools 22 that may be controlled include the Sunstrand Omni Mill and the Gordon 230 Tape Master. Likewise, channel 11 is connected along transmission lines 17 to a receive control unit 19. The receive control unit 19 is connected along line 21 to the machine control unit 23. An example of the receiver control unit is the IBM 2701 as described in "IBM 2701 Parallel Data Adapter," IBM Form No. A22—6844, 1964.

The transmission control units 14 and 15 perform two functions. First, they transmit pulses from the demand pulse oscillator of the receive control units to the channels to cause new words to be entered into the output register of the channels. Additionally, they amplify and shape the words received from the output register for transmission to the receive control units. An example of the transmission control unit would be the transmission control unit used in the IBM 360 as described in "IBM System 360 I/O from Interface Channel to Control Unit," IBM, Form No. A23—6843, 1964. It should be understood that the desired information read by the transmission control unit is in fact the command word. The suitable form for transmission being whatever is required for a selected transmission system, such as a digitally encoded electrical signal for an electrical communication line. Again, the sequential entering of words from the core storage unit 27 into the channels under control of an externally generated pulse is well known and is described in the above-referenced manual. Briefly, the operation is as follows:

Each channel has two registers. The first register, a word count register, will be loaded by the CPU with the number of words which the channel will read from core storage. A second register, the channel address register, will be loaded by the CPU with the first address in core storage that is to be read from core into the I/O register. The pulses from the oscillator which are applied to each channel are used to gate the address in the channel address register into the memory address register (not shown) of the core storage unit. Each time that the address from the channel address register is entered into the memory address register the word count register is counted down and the address contained in the channel address register incremented (or decremented). When the word count register has been counted down to zero, any further transfer of the contents of the channel address register to the memory address register is inhibited. The CPU must then load a new address into the channel address register and a new count into the word count register. Alternatively, a chaining process can be used which results in the automatic loading of these two registers without processor intervention.

In operation a loading routine causes the central processing unit 6 to read the output data of the postprocessor, perform tests, issue diagnostics if errors are discovered, and make calculations to produce data in a format convenient for real-time interpolation. When cutting begins, an interpolation technique, which will be hereinafter described in detail, is performed by the DNC computer 1 under the control of an interpolation program to produce a sequence of command words which are stored in several output buffer tables in the core storage unit 27 of the computer. The size and number of these output buffer tables is determined by the type of computer channels available and the maximum feedrate of the machine tool. Usually two or three output buffer tables will suffice, with each table containing enough command words to operate the machine tool for approximately 1 second.

For purposes of illustration, the operation of channel 10 to control the machine tool 22 will be described. It should be understood that the operation of all other channels and their associated machine tools is identical. The computer channel 10, operating asynchronously with the central processing unit 6 of the computer, reads the command words from the output buffer table in the core storage unit 27 and sends them to the output register. The output register stores exactly one command word and this command word is read by the transmission control unit 14. The channel 10 reads one command word from core storage each time it receives a signal through the transmission control unit 14 from the demand pulse oscillator of the receive control unit 18. As shown, this oscillator is located in the receive control unit adjacent the machine tool. Alternatively, the demand pulse oscillator could be located at the transmission control unit 14; but more positive control is exercised by locating this unit near the machine tool.

There are a number of ways that the transmission control unit can transmit the information from the output register of the computer channel 10 to the machine tool servos. The simplest method is to provide two parallel transmission lines for each servo axis, one for positive pulses and one for negative pulses. For a three-axis machine this would require six parallel lines—seven if a parity line is desired. The transmission control unit 14 reads the desired information from the command word stored in the output register of the computer channel 10 and sends it over the transmission lines 16 in the form suitably powered for transmission. The receive control unit 18 receives the signals, filters out noise and checks the signals received for parity and validity. The receiver control unit 18 may use any well-known signal filtering technique to filter out the noise. Examples of references being "Communications Networks," by E. A. Guillemin, John Wiley and Sons, 1955, "Passive Network Synthesis," by James E. Storer, McGraw Hill, 1957. The checking of signal received for parity and validity may be accomplished by any suitable data error checking technique such as that described in "Digital Computer Technology and Design," by Willis H. Ware, John Wiley, 1953, page 12.42 *ff.* A valid command group will be sent to the servosystem of the machine tools. Invalid signals will be replaced by resampling the received signal levels. The error checking above indicated whether the command is valid or invalid and conventional logic design is employed to provide circuits to respond to the indication to send the valid command or resample if invalid. Resampling will continue until a valid signal is stored in the receive-control unit. Conventional logic design is employed to provide circuits to respond to the indication to send the valid command or resample if invalid. An interrupt is returned to the DNC Computer in the event that repetitive resampling fails to deliver a valid command group. An interrupt being a conventional signal generated by conventional circuitry such as that described in Ware, referenced above, at pages 13.44*ff.* The conventional logic design utilized can be that basic logic design taught in such tests as "Logic Design of Digital computers," by Montgomery Phister, Jr., John Wiley, 1959, or "The Logic Design of Transistor Digital Computers", by Gerald A. Maley and John Earle, Prentice-Hall Incorporated, 1963. The DNC Computer can then either take corrective action such as retransmitting the command word, or can halt operations so that the problem can be diagnosed. The receive control units will not be described in detail since conventional odd parity checking is used and the validity check to sense the occurrence of two ones in the bit positions of an axis is done in a straightforward manner by AND gates.

The demand pulse oscillator is set at such a frequency that the pulse train transmitted by the transmission control unit will cause the slides of the associated machine tool to move at the maximum feed rate in the event that there are one bits in the allowable bit positions of each of the command words which are read from core storage by the channel. The utilization of the external oscillator is a valuable part of the subject system since it relieves the computer of the burden of generating internal timing. Additionally, it provides a convenient vehicle for varying the feedrate or aborting the cut, if necessary. Normally, however, in the absence of adaptive control or an unforeseen problem, the frequency of the oscillator remains fixed.

As above indicated, in the present interpolation technique the command words which are generated are stored directly in core. The basic linear interpolation technique is a follows:

Let $\Delta s=\sqrt{(\Delta x)^2+(\Delta y)^2+(\Delta z)^2}$ be the length of the segment in machine units and let F be the fraction of the maximum vector feedrate programmed for the segment, i.e. $F$= programmed feedrate/maximum vector feedrate. Then the number of clock periods needed to cut the segment is $\Delta t=\lceil \Delta s/F \rceil$ where $\lceil \Delta s/F \rceil$ is the smallest integer which is greater than or equal to $\Delta s/F$, i.e., $\Delta s/F$ must be "rounded up" to the nearest integer. But $\Delta t$ is also the number of command words which must be generated to cut the segment. (In the case of a four or five axis machine, it has been assumed that the magnitude of $\Delta\Phi$ and the magnitude of $\Delta\theta$ is less than $\Delta t$. If not, the magnitude of the largest of $|\Delta\Phi|$ and $|\Delta\theta|$ must be substituted for $\Delta t$ to insure that the required number of 1's are stored in command words. Thus, if $\Delta x=10$, and $F=1$ so that $\Delta t=10$, but $\Delta\Phi=15$ and $\Delta\theta=-20$, 20 command words are required to cut the segment.) Next, $\Delta t/\Delta u=J_u+R_u+\epsilon_u$, where $J_u$ is a nonnegative integer and $R_u+\epsilon_u$ is the remainder term, i.e., $\Delta t/|\Delta x|=J_x+R_x+\epsilon_x$, $\Delta t/|\Delta y|=J_y+R_y+\epsilon_y$ etc. This remainder term. $R_u+\epsilon_u$, will be approximated by $\overline{R_u}$ for the interpolation program with an error, $\epsilon_u$, which is small enough to neglect. The interpolation program sets the "1" bits for the $x$-axis first, followed by the $y$-axis bits, the $x$-axis bits, etc. If $R_x$ is zero and $\Delta x$ is positive, the interpolation program need only put a "1" bit in the positive $x$-axis position of the $J_x$th command word for the segment, place another "1" bit in the positive $x$-axis position of the $2J_x$th command word of the segment, etc. until $\Delta x$ 1's have been set, at which time the program will set the $y$-axis "1" bits. If $R_x\neq 0$, the mechanics of the process is not quite so simple. In all cases a J-register and a R-register are set up for the $x$-axis. Then $J_x$ is loaded into the J-register and $R_x$ is loaded into the R-register. The program then sets a 1 bit in the proper $x$-axis position of the $J_x$th command word for the segment. The registers are then incremented by $J_x$ and $R_x$ respectively, and a test for overflow is performed on the R-register. If an overflow is detected, the value of the J-register is incremented by 1 and another "1" bit is set in the appropriate $x$-axis position of the command word whose ordinal number in the segment is the value in the J-register. The process is repeated until either the end of the segment or the end of the buffer has been reached, whichever occurs first. The process is then repeated for the $y, z, \Phi, \theta$, axes.

For example, suppose $\Delta x=4$, $\Delta y=-4$, $\Delta z=2$ and $F=0.2$ so that $\Delta s=\sqrt{16+16+4}=6$ and $\Delta t=6/0.2=30$. Hence $J_x=J_y=7$, $R_x=R_y=0.5$a, $J_z=15$ and $R_z=0.0$. FIG. 2 shows the numbers stored in the corresponding registers after incrementation and a possible carry of 1 into the J-register. All R-registers are scaled as fractions with the binary point at the left end of the register. All quantities in registers are assumed positive because the matter of sign is taken care of by placing the "1" bits in either the left or right bit positions for the axis in the command word depending upon whether the motion is to be negative or positive for the axis under consideration. The contents of the registers are shown in the table of FIG. 2. The command words generated in accordance with the overflow of the registers associated with each of the axes are shown in FIG. 3. It will be noted that there are exactly four positive $x$ pulses, four negative $y$ pulses and two positive $z$ pulses stored in the command words for this segment.

While this technique is inefficient in the sense that null words are stored in core, the prime problem associated with null words, i.e., the time required for their generation and consequent computer loading, is greatly reduced by a technique of storing preset words into core. For a particular segment, if more ones than zeros are to be stored in the axis locations of the word, all the axis locations are preset to 1 and zeros selectively entered. If more zeros than ones are to be stored in an axis location, the opposite is true.

For example, if for a particular axis, say the $x$-axis, $|\Delta x|/\Delta t>1/2$, then more than half of the command words for the segment contain 1's and so it is more efficient to store a 1 in the appropriate $x$-axis position of each command word for the segment and then go back and replace some of the 1's with 0's. To do this, the new integer and remainder is calculated viz:

$$J_x+R_x+\epsilon_x=\frac{\Delta t}{\Delta t-|\Delta x|}$$

and by the same incrementation scheme as before, zeros are entered for the $x$-axis. Thus, suppose that $\Delta x=7$, $\Delta y=-25$, $\Delta z=5$ and $\Delta t=35$. Then $J_x=5$, $R_x=0.0$, $J_z=7$, $R_z=0.0$ and, since $\Delta t/|\Delta y|=35/25=7/5$ 2, we set $J_y=R_y=\Delta t/(\Delta t-|\Delta y|)=3.5$ so that $J_y=3$ and $R_y=0.5$. Thus, the 5th, 10th, 15th, 20th, 25th, 30th and 35th words of the segment will indicate negative $x$-pulses while all except the 3rd, 7th, 10th, 14th, 17th, 21st, 24th, 28th, 31st and 35th will show positive $y$-pulses. The contents of the registers during this interpolation as well as the command words generated in accordance with the contents of the registers during the interpolation, and the initialized core contents are illustrated in the tables of FIGS. 4 and 5.

Figure 6:
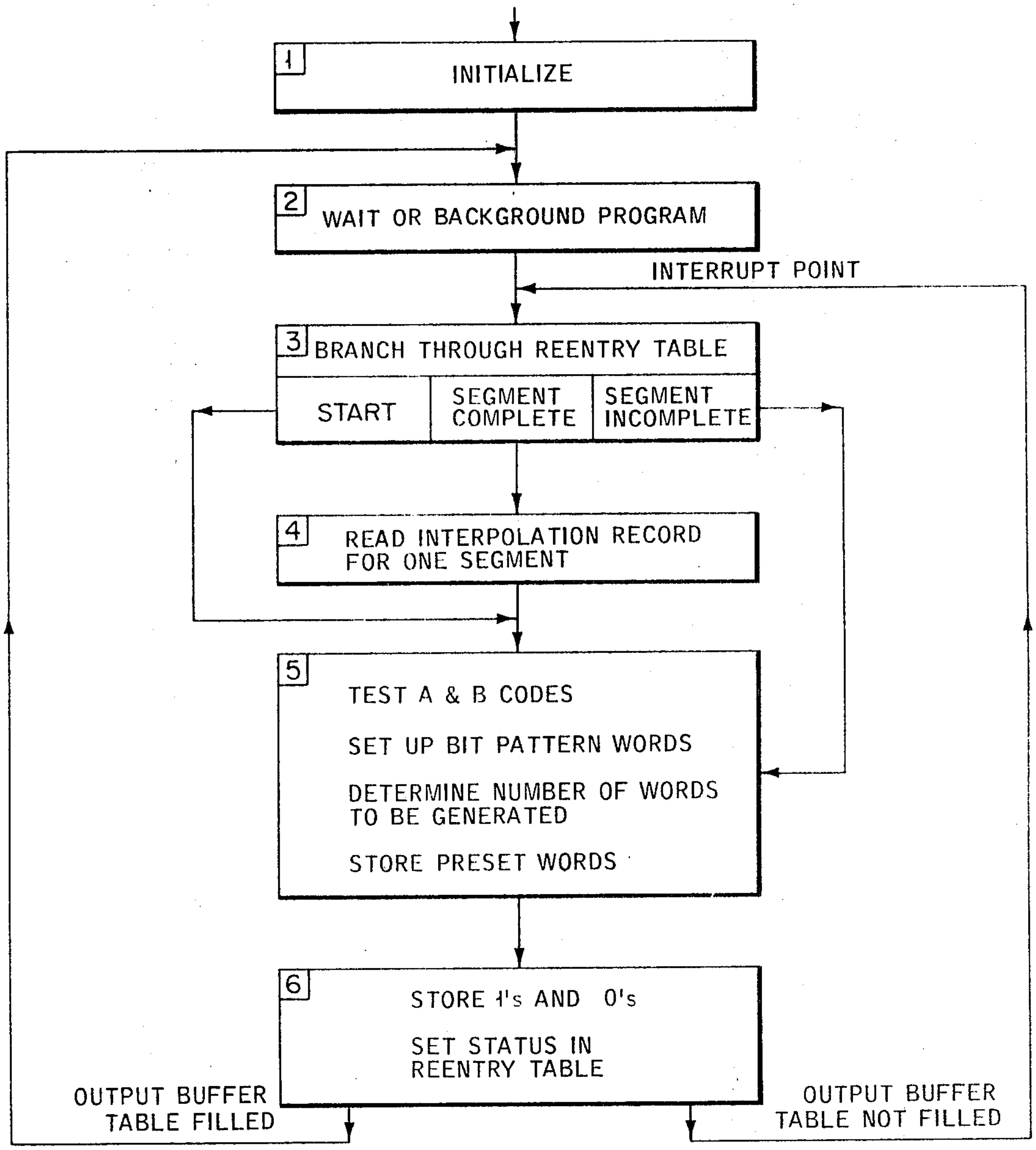
FIG. 6 is a flow chart describing the steps taken to implement the present interpolation and initialization technique.

In FIG. 6 is shown a flow diagram describing the subject novel interpolation technique and initialization scheme as performed by an IBM 1800 Processing System. The initialization routine of block 1 performs a number of functions, including the sending of messages to the machinist; however, the only function which is pertinent here is that three 255-word output buffer tables are loaded with null (all zero) command words and the reentry table is set up to indicate that the program is in the start-up phase. In the second block, which is labeled wait or background program, the computer either goes into a wait state or executes a background program, possibly interpolation for another machine tool, until the machinist initiates operation by signalling the computer that he wishes to begin cutting. The machine tool reads the first output buffer table of null commands which causes no motion. When the table has been read an external interrupt starts the computer through box 3 (as does every external interrupt). Before the machine tool has read the second buffer table of null command words, the computer has loaded the first table with the first set of active computer command words. When the second interrupt occurs after the second output buffer table of null words has been read, the computer fills the second table with command words. Finally, the machine tool finishes with the third output buffer table of null words, sends an interrupt to cause the computer to load the third output buffer table with active command words and starts to read the first output buffer table which contains the command words to begin cutting the first segment of the part. The reentry table stores the information that indicates the status of the interpolation program. In general, it tells the program where it left off during the last execution cycle and which machine tool is being serviced in multiple tool operation. The first time through box 3 the program branches directly to box 5 since, as part of the initialization routine, the first interpolation record has been read and the type checked for use in box 5. Normally, at the start of a segment, the program is routed through box 4 to read a record from storage which gives all of the pertinent information for cutting a segment.

If on the previous cycle a buffer table was filled before an end of segment was reached, box 4 is skipped and the program branches directly from box 3 to box 5. However, in this case, the entry point to box 5 is different from when the program branches from box 4, because many of the tests will have already been made. Box 5 is a preparatory box for the main function of the interpolation routine, which occurs in box 6. In box 5 the number of words necessary to fill the buffer table or finish the segment is determined and this number of preset words is loaded into the table. The input signals are checked in order to set up the machinery for changing one and zero bits in the preset words in the buffer. For example, the input signals may indicate that, on a 5-axis machine, 3 special computer words are set up. One of these is for the $y$-axis, one for the $z$-axis and one for the Φ-axis. No changes will be made to the stored preset words with respect to the $x$-axis and $\theta$-axis because the input signals indicate no change in the coordinates of these axes while cutting the segment. On the other hand, to store negative $y$-pulses a special word is set up which contains all zeros except for the 8th bit position which contains a one, and bit position 1 which contains a one which is needed to reset the parity bit in the preset command words which are to be modified. Likewise, a special word is set up with ones only a bit positions 1 and 10 to store negative $z$ commands and a computer word with ones only in bit positions 1 and 13 to store positive Φ commands. For example, suppose that $\Delta x=0$, $\Delta y=-7$, $\Delta z=-28$, $\Delta\Phi=14$, $\Delta\theta=0$ and $\Delta t=35$ so that $J_y=5$, $J_z=\Delta t/(\Delta t-|\Delta z|)=35/7=5$, $J\Phi=2$ and $R\Phi=0.5$. All other $R$'s are zero. Then the preset word has bit positions 6 through 15 as shown below.

| | | | | | | | | | |
|---|---|---|---|---|---|---|---|---|---|
| 0 | 0 | 0 | 0 | 1 | 0 | 0 | 0 | 0 | 0 |
| 6 | 7 | 8 | 9 | 10 | 11 | 12 | 13 | 14 | 15 |

The reason for the patterns is that there are no pulses for the $x$-axis, less than half the command words require a negative $z$-pulse, less than half the words require a Φ-pulse and no command words require a $\theta$-pulse. The incrementation procedure shows that the 5th, 10th, 15th, 20th, 25th, 30th, and 35th preset word should contain a negative $y$-pulse. Hence, the exclusive–OR operation between these command words and the special $y$-axis word having all zeros except for bit positions 1 and 8 will put a 1 bit in the proper locations. The incrementation procedure also indicates that these same words should not have a negative $z$-pulse although all the words in the buffer already have them. As before, the exclusive–OR is performed between each of these command words and the special $Z$-axis word which was set up with a 1, other than the parity bit, only in the negative $z$-axis position, bit position 10. This operation converts the ones in the negative $z$-axis positions to zeros and all $z$-axis positions of the words in the buffer are thus set correctly. The same procedure then is applied to the Φ-axis positions to place positive Φ-axis pulses in the 2nd, 5th, 7th, 10th, 12th, 15th, 20th, 22nd, 25th, 27th, 30th, 32nd and 35th command words. Note that in each case the parity bit is changed in the preset word as it should be, since a one is always either added or deleted in the preset word being modified.

When all the preset words that have been loaded into the output buffer table have been serviced, the status of the program is stored in the reentry table. If the buffer has been filled, the program branches to box 2 to either a wait state or to execution of a background program. If the buffer has not been filled, then a segment has been completed and the branch is made to box 3 to complete the filling of the buffer table. Only one buffer table is filled at a time and an output buffer table is filled each time an interrupt signals that the machine tool has read all the command words from a table. Thus, the machine tool cuts the part, segment by segment, until the interpolation program reads a record which indicates that all the segments have been cut. The interpolation routine then sets up the necessary logic to stop the machine tool when the last segment is complete and to send a message to the machinist advising him that the cutting of the part has been completed.

In summary, there is provided an interpolation technique for use primarily with a system in which an external oscillator is used to gate command words stored in a core storage unit to the servos of an associated machine tool. In this technique numbers are calculated based on the distance and velocity which each slide is to move during the cutting of a segment and these numbers are added and command or one bits entered into the appropriate bit positions of the command words in the output buffer tables of the core storage unit.

The loading of the control computer central processing unit is reduced by a technique of examining the numbers generated to determine if more ones than zeros, or vice versa, are to be stored in the core storage unit for each axis for a particular segment and the output buffer tables in the core storage unit for that section initialized in accordance with this determination. In the event that more ones than zeros are to be stored in the bit positions of the command words associated with a particular axis, the number associated with that axis is then recalculated such that the modification of the command words in the output buffer tables in the core storage unit will result in the bit positions which had been initialized to ones being selectively changed to zeros.

While the invention has been particularly shown and described with reference to a preferred embodiment thereof, it will be understood by those skilled in the art that various changes in the form and details may be made therein without departing from the spirit and scope of the invention.

What we claim is:

1. In a direct numerical control system, a system for setting up a sequence of ordinally designated command words for each axis, for subsequently providing command pulses to each axis servo of a machine tool to effect movement of the slides of said machine tool, in response to input signals indicative of the length and velocity that each slide is to move during the cutting of increments forming a segment, said system comprising:

processing means in said computer for calculating a control number J for each axis for said segment in response to said input signals, said control number comprising the ratio of the number of predetermined time periods required to cut said segment to the length of said segment along said axis;

a core storage unit in said computer including output buffer tables therein for storing said sequence of command words, each of said command words having bit positions for containing command bits for each slide in accordance with whether the command word is to effect incremental movement of each slide and whether said movement is in a positive or negative direction; and means for entering command bits in said storage unit in the *J*th designated command word for each axis, the 2*J*th command word for each axis, the 3*J*th command word for each axis and each subsequent *J*th command word for each axis until the number of command bits required for each axis for the cutting of said segment have been entered, said means operating in response to said control number and said length input signal for each said axis.

2. The system of claim 1 wherein said control number calculated by said processing means for at least one said axis comprises an integer *J* and a remainder *R* for each axis; and said means for entering command bits in said storage units includes means for entering a command bit in the command word for said axis in said storage unit having an ordinal number designation equal to *J*, means for then incrementing the numbers *J* and *R* by *J* and *R*, means for performing a test for sum greater than one on the resultant *R* sum, means for then incrementing the resultant *J* sum in response to said *R* sum being greater than one, and means for entering a command bit in the command word for said axis in said storage unit having an ordinal number designation equal to the resultant final value of *J*.

3. The system of claim 1 further including means for presetting all of the portions of said storage unit associated with each axis with either command bits or null bits in response to whether said entering means is to enter said command bits in a majority or a minority of said bit positions for said axis.

4. The system of claim 2 further including means for presetting all of the portions of said storage unit associated with each axis with either command bits or null bits in response to whether said entering means is to enter said command bits in a majority or a minority of said bit positions for said axis.

5. The system of claim 2 wherein said processing means calculates said control numbers *J* and *R* for each axis (*x*, *y*, *z*) of a three-axis machine as follows:

$$J_x+R_x=\frac{\Delta t}{\Delta x}$$

$$J_y+R_y=\frac{\Delta t}{\Delta y}$$

$$\left[J_z+R_z+\frac{\Delta t}{\Delta z}\right]\underline{J_z+R_z=\frac{\Delta t}{\Delta z}}$$

where $$\Delta t=\frac{\Delta t}{F}$$

and $$\Delta s=\sqrt{(\Delta x)^2+(\Delta y)^2+(\Delta z)^2}$$

and $$F=\frac{\text{Programmed feedrate}}{\text{maximum vector feedrate}}$$

and wherein $\Delta x$, $\Delta y$, $\Delta z$ represent said length input signals and F represents said velocity signal for said segment.

6. The system of claim 5 further including means for presetting all of the portions of said storage unit associated with each axis with either command bits or null bits in response to whether said entermeans is to enter said command bits in a majority or a minority of said bit positions for said axis.

7. The system of claim 6 wherein said presetting means includes means for presetting said portions of said storage unit for an axis with command bits in response to said control number *J*+*R* for the axis produced by said processing means being less than 2 and for presetting said portions of said storage unit for the axis with null bits in response to said control number for the axis being greater than 2.

8. The system of claim 7 wherein said processing means additionally is responsive to said control number for an axis being less than 2, for then recalculating said control number for that axis as follows:

$$J+R=\frac{\Delta t}{\Delta t-|\text{distance along axis}|}.$$